United States Patent
Kou et al.

(10) Patent No.: US 11,005,947 B2
(45) Date of Patent: May 11, 2021

(54) NETWORK INFORMATION PROCESSING

(71) Applicant: Advanced New Technologies Co., Ltd., George Town (KY)

(72) Inventors: Guannan Kou, Hangzhou (CN); Hongquan Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,582

(22) Filed: May 29, 2020

(65) Prior Publication Data
US 2020/0304580 A1    Sep. 24, 2020

Related U.S. Application Data

(63) Continuation of application No. PCT/CN2019/080071, filed on Mar. 28, 2019.

(30) Foreign Application Priority Data

Jun. 25, 2018   (CN) .......................... 201810661510.1

(51) Int. Cl.
*H04L 29/08*   (2006.01)
*H04L 12/46*   (2006.01)
*H04L 12/58*   (2006.01)

(52) U.S. Cl.
CPC ........ *H04L 67/146* (2013.01); *H04L 12/4633* (2013.01); *H04L 51/14* (2013.01); *H04L 67/145* (2013.01)

(58) Field of Classification Search
CPC . H04L 67/146; H04L 12/4633; H04L 67/145; H04L 51/14
See application file for complete search history.

(56) References Cited

U.S. PATENT DOCUMENTS

| 2017/0142073 | A1  | 5/2017 | Fransen |
| 2018/0198867 | A1* | 7/2018 | Dao ................. H04W 36/0016 |
| 2020/0053636 | A1* | 2/2020 | Mas Rosique ........ H04W 48/18 |

FOREIGN PATENT DOCUMENTS

| CN | 102209111 | 10/2011 |
| CN | 102761864 | 10/2012 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Soe Hlaing
(74) *Attorney, Agent, or Firm* — Fish & Richardson P.C.

(57) ABSTRACT

A computer-implemented network communication method includes receiving, by a network access stratum device, an uplink message sent by a terminal device, in which the uplink message is sent over a persistent connection between the network access stratum device and the terminal device; encapsulating, by the network access stratum device, the uplink message and a session identifier of the persistent connection into a target message; transmitting, by the network access stratum device, the target message to a message forwarding device over a short-term connection between the network access stratum device and the message forwarding device; receiving, by the network access stratum device, from the message forwarding device, a downlink message corresponding to the target message, in which the downlink message includes the session identifier; identifying, by the network access stratum device, the terminal device as a receiving device of the downlink message based on the session identifier; and sending, by the network access stratum device, the downlink message to the terminal device.

18 Claims, 10 Drawing Sheets

(56) References Cited

FOREIGN PATENT DOCUMENTS

| CN | 103067215 | | 4/2013 |
|----|-----------|---|--------|
| CN | 103138961 | | 6/2013 |
| CN | 103139731 | | 6/2013 |
| CN | 102761864 B | * | 12/2014 |
| CN | 105391776 | | 3/2016 |
| CN | 105933435 | | 9/2016 |
| CN | 107517227 | | 12/2017 |
| CN | 108965400 | | 12/2018 |
| WO | WO 2016197861 | | 12/2016 |
| WO | WO 2017121485 | | 7/2017 |
| WO | WO 2017218775 | | 12/2017 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Appln No. PCT/CN2019/080071, dated Jun. 27, 2019, 9 pages (with partial English translation).
EP Extended Search Report in European Application No. 19824895.7, dated Mar. 1, 2021, 6 pages.

* cited by examiner

NETWORK INFORMATION PROCESSING

CROSS-REFERENCE TO RELATED APPLICATIONS

This application is a continuation of PCT Application No. PCT/CN2019/080071, filed on Mar. 28, 2019, which claims priority to Chinese Patent Application No. 201810661510.1, filed on Jun. 25, 2018, and each application is hereby incorporated by reference in its entirety.

TECHNICAL FIELD

The present specification relates to the field of computer technologies, and in particular, to information processing methods, apparatuses, devices, and systems.

BACKGROUND

In an Internet of Things service system, because of service needs such as message pushing, a large quantity of terminal devices in the Internet of Things need to maintain a persistent network connection to a server.

In current Internet of Things service solutions, a persistent network connection is maintained between terminals and an Internet of Things HUB (IoT HUB). Maintaining a persistent network connection causes relatively large resource overheads on the server. Heartbeat processing, memory overheads on the server, etc. cause performance downgrading of an IoT HUB system responsible for message processing. As such, memory overheads and heartbeat maintenance overheads of the IoT HUB are excessively high, especially in hundreds of millions of IoT scenarios. Therefore, in the Internet of Things service field, a device connection solution needs to be more stable and consume fewer resources on the server.

SUMMARY

An objective of implementations of the present specification is to provide information processing methods, apparatuses, devices, and systems, so as to provide a more stable device connection solution with less resource consumption on a server.

To alleviate the previous technical problem, the implementations of the present specification are implemented as described below.

Implementations of the present specification provide an information processing method, where the method is applied to a network access stratum device, where a persistent connection is maintained between the network access stratum device and a terminal device, and where a short connection is maintained between the network access stratum device and a message forwarding device; the method includes: receiving an uplink message sent by the terminal device; encapsulating the uplink message and a session identifier of the persistent connection maintained between the network access stratum device and the terminal device into a target message corresponding to a short connection; sending the target message to the message forwarding device, and receiving a downlink message corresponding to the target message and sent by the message forwarding device, where the downlink message includes the session identifier; determining a receiving device of the downlink message based on the session identifier; and sending the downlink message to the terminal device corresponding to the session identifier.

Optionally, the method further includes: receiving a heartbeat request sent by the terminal device; obtaining heartbeat response information corresponding to the heartbeat request; and sending the heartbeat response information to the terminal device.

Optionally, the method further includes: obtaining heartbeat information of the terminal device when a predetermined heartbeat reporting period is reached; and sending the heartbeat information to the terminal device.

Implementations of the present specification provide an information processing method, where the method is applied to a terminal device, and a persistent connection is maintained between the terminal device and a network access stratum device; the method includes: sending an uplink message to the network access stratum device, so the network access stratum device encapsulates the uplink message and a session identifier of the persistent connection maintained between the terminal device and the network access stratum device into a target message corresponding to a short connection, sends the target message to a message forwarding device, receives a downlink message sent by the message forwarding device, where the downlink message includes the session identifier, and determines a receiving device of the downlink message based on the session identifier; and receiving the downlink message corresponding to the uplink message and sent by the network access stratum device.

Optionally, the method further includes sending a heartbeat request to the network access stratum device; and receiving heartbeat response information corresponding to the heartbeat request and sent by the network access stratum device.

Optionally, sending a heartbeat request to the network access stratum device includes: sending a heartbeat request to the network access stratum device when a predetermined heartbeat detection period is reached.

Implementations of the present specification provide an information processing method, where the method is applied to a message forwarding device, and a short connection is maintained between the message forwarding device and a network access stratum device; the method includes: receiving a target message sent by the network access stratum device, where the target message is obtained after an uplink message sent by a terminal device and a session identifier of a persistent connection established between the network access stratum device and the terminal device are encapsulated corresponding to a short connection; and sending a downlink message corresponding to the target message to the network access stratum device, where the downlink message includes the session identifier.

Implementations of the present specification provide an information processing apparatus, where a persistent connection is maintained between the apparatus and a terminal device, and a short connection is maintained between the apparatus and a message forwarding device; the apparatus includes: a message receiving module, configured to receive an uplink message sent by the terminal device; an encapsulation module, configured to encapsulate the uplink message and a session identifier of the persistent connection maintained between the network access stratum device and the terminal device into a target message corresponding to a short connection; a transceiver module, configured to send the target message to the message forwarding device, and receive a downlink message corresponding to the target message and sent by the message forwarding device, where the downlink message includes the session identifier; a device determining module, configured to determine a receiving device of the downlink message based on the session identifier; and a message sending module, configured to send the downlink message to the terminal device corresponding to the session identifier.

Optionally, the apparatus further includes: a request receiving module, configured to receive a heartbeat request sent by the terminal device; a response acquisition module, configured to obtain heartbeat response information corresponding to the heartbeat request; and a response information sending module, configured to send the heartbeat response information to the terminal device.

Optionally, the apparatus further includes: a heartbeat acquisition module, configured to obtain heartbeat information of the terminal device when a predetermined heartbeat reporting period is reached; and a heartbeat sending module, configured to send the heartbeat information to the terminal device.

Implementations of the present specification provide an information processing apparatus, where a persistent connection is maintained between the apparatus and a network access stratum device; the apparatus includes: a message sending module, configured to send an uplink message to the network access stratum device, so the network access stratum device encapsulates the uplink message and a session identifier of the persistent connection maintained between the apparatus and the network access stratum device into a target message corresponding to a short connection, sends the target message to a message forwarding device, receives a downlink message sent by the message forwarding device, where the downlink message includes the session identifier, and determines a receiving device of the downlink message based on the session identifier; and a message receiving module, configured to receive the downlink message corresponding to the uplink message and sent by the network access stratum device.

Optionally, the apparatus further includes: a request sending module, configured to send a heartbeat request to the network access stratum device, and a response information receiving module, configured to receive heartbeat response information corresponding to the heartbeat request and sent by the network access stratum device.

Optionally, the request sending module is configured to send a heartbeat request to the network access stratum device when a predetermined heartbeat detection period is reached.

Implementations of the present specification provide an information processing apparatus, where the apparatus is applied to a message forwarding device, and a short connection is maintained between the message forwarding device and a network access stratum device; the apparatus includes: a message receiving module, configured to receive a target message sent by the network access stratum device, where the target message is obtained after an uplink message sent by a terminal device and a session identifier of a persistent connection established between the network access stratum device and the terminal device are encapsulated corresponding to a short connection; and a message sending module, configured to send a downlink message corresponding to the target message to the network access stratum device, where the downlink message includes the session identifier.

Implementations of the present specification provide a network access stratum device, where a persistent connection is maintained between network access stratum device and a terminal device, and a short connection is maintained between network access stratum device and a message forwarding device, the network access stratum device includes: a processor and a memory, configured to store computer executable instructions, where when the executable instructions are being executed, the processor is enabled to: receive an uplink message sent by the terminal device; encapsulate the uplink message and a session identifier of the persistent connection maintained between the network access stratum device and the terminal device into a target message corresponding to a short connection; send the target message to the message forwarding device, and receive a downlink message corresponding to the target message and sent by the message forwarding device, where the downlink message includes the session identifier; determine a receiving device of the downlink message based on the session identifier; and send the downlink message to the terminal device corresponding to the session identifier.

Implementations of the present specification provide a terminal device, where a persistent connection is maintained between the terminal device and a network access stratum device; the terminal device includes: a processor; and a memory, configured to store computer executable instructions, where when the executable instructions are being executed, the processor is enabled to: send an uplink message to the network access stratum device, so the network access stratum device encapsulates the uplink message and a session identifier of the persistent connection maintained between the terminal device and the network access stratum device into a target message corresponding to a short connection, sends the target message to a message forwarding device, receives a downlink message sent by the message forwarding device, where the downlink message includes the session identifier, and determines a receiving device of the downlink message based on the session identifier; and receive the downlink message corresponding to the uplink message and sent by the network access stratum device.

Implementations of the present specification provide a message forwarding device, where a short connection is maintained between the message forwarding device and a network access stratum device; the message forwarding device includes: a processor; and a memory, configured to store computer executable instructions, where when the executable instructions are being executed, the processor is enabled to: receive a target message sent by the network access stratum device, where the target message is obtained after an uplink message sent by a terminal device and a session identifier of a persistent connection established between the network access stratum device and the terminal device are encapsulated corresponding to a short connection; and send a downlink message corresponding to the target message to the network access stratum device, where the downlink message includes the session identifier.

Implementations of the present specification provide an information processing system, where the system includes a network access stratum device, a terminal device, and a message forwarding device, where: a persistent connection is maintained between the network access stratum device and the terminal device, and a short connection is maintained between the network access stratum device and the message forwarding device; the network access stratum device receives an uplink message sent by the terminal device, the network access stratum device encapsulates the uplink message and a session identifier of the persistent connection maintained between the network access stratum device and the terminal device into a target message corresponding to a short connection, and sends the target message to the message forwarding device; the network access stratum device receives a downlink message corresponding to the target message and sent by the message forwarding device, where the downlink message includes the session identifier; and the network access stratum device determines a receiving device of the downlink message based on the session identifier, and sends the downlink message to the terminal device corresponding to the session identifier.

Optionally, the network access stratum device is a standalone device.

Optionally, the system includes multiple network access stratum devices, a short connection is maintained between each network access stratum device and the message forwarding device, and a persistent connection is maintained between at least one network access stratum device and the terminal device.

It can be understood from the technical solutions provided in the implementations of the present specification that the implementations of the present specification include a network access stratum device, a terminal device, and a message forwarding device. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier, determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state. When the message forwarding device pushes a downlink message, the network access stratum device can correctly find a corresponding terminal device and push the downlink message.

BRIEF DESCRIPTION OF DRAWINGS

To describe technical solutions in implementations of the present specification or in the existing technology more clearly, the following briefly describes the accompanying drawings needed for describing the implementations or the existing technology. Clearly, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

Implementations of the present specification provide information processing methods, apparatuses, devices, and systems.

To make a person skilled in the art better understand the technical solutions in the present specification, the following clearly and comprehensively describes the technical solutions in the implementations of the present specification with reference to the accompanying drawings in the implementations of the present specification. Clearly, the described implementations are merely some rather than all of the implementations of the present specification. All other implementations obtained by a person of ordinary skill in the an based on the implementations of the present specification without creative efforts shall fall within the protection scope of the present specification.

Implementation 1

Figure 1:
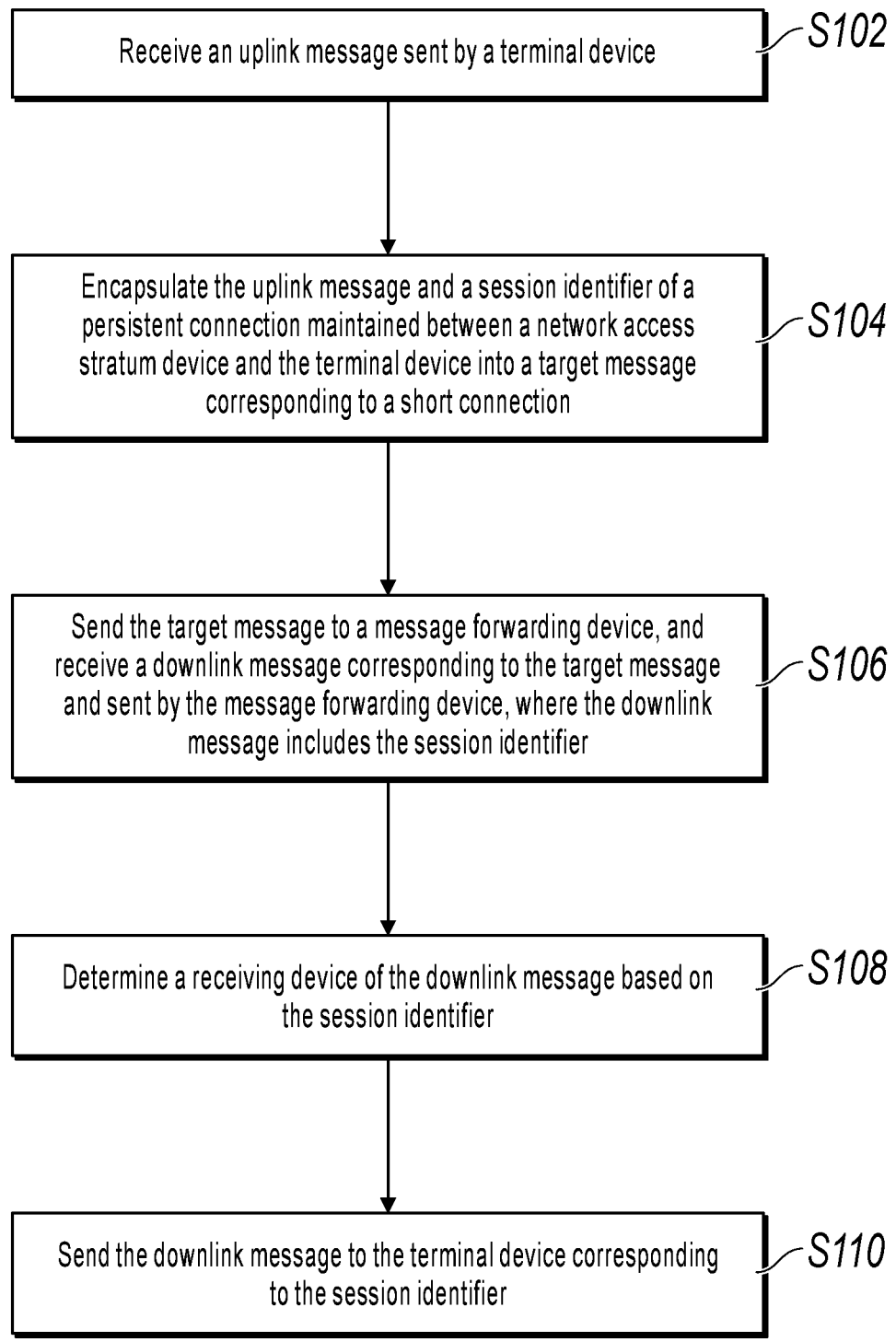
FIG. 1 is an implementation of an information processing method, according to the present specification.

As shown in FIG. 1, implementations of the present specification provide an information processing method. The method can be executed by a network access stratum device. The network access stratum device can be a terminal device or a server. The terminal device can be a device such as a personal computer, or can be a mobile terminal device such as a mobile phone or a tablet computer. The terminal device can be a terminal device used by a user. The server can be a standalone server, or can be a server cluster including multiple servers. In addition, the server can be a backend server of a certain service or can be a server in the Internet of Things. and the server can have functions such as information receiving and sending, and information processing. The method can be used to alleviate a problem that a terminal device in a network such as the Internet of Things needs to maintain a persistent connection to a message forwarding device etc., which causes relatively large resource consumption of the message forwarding device.

Figure 2:
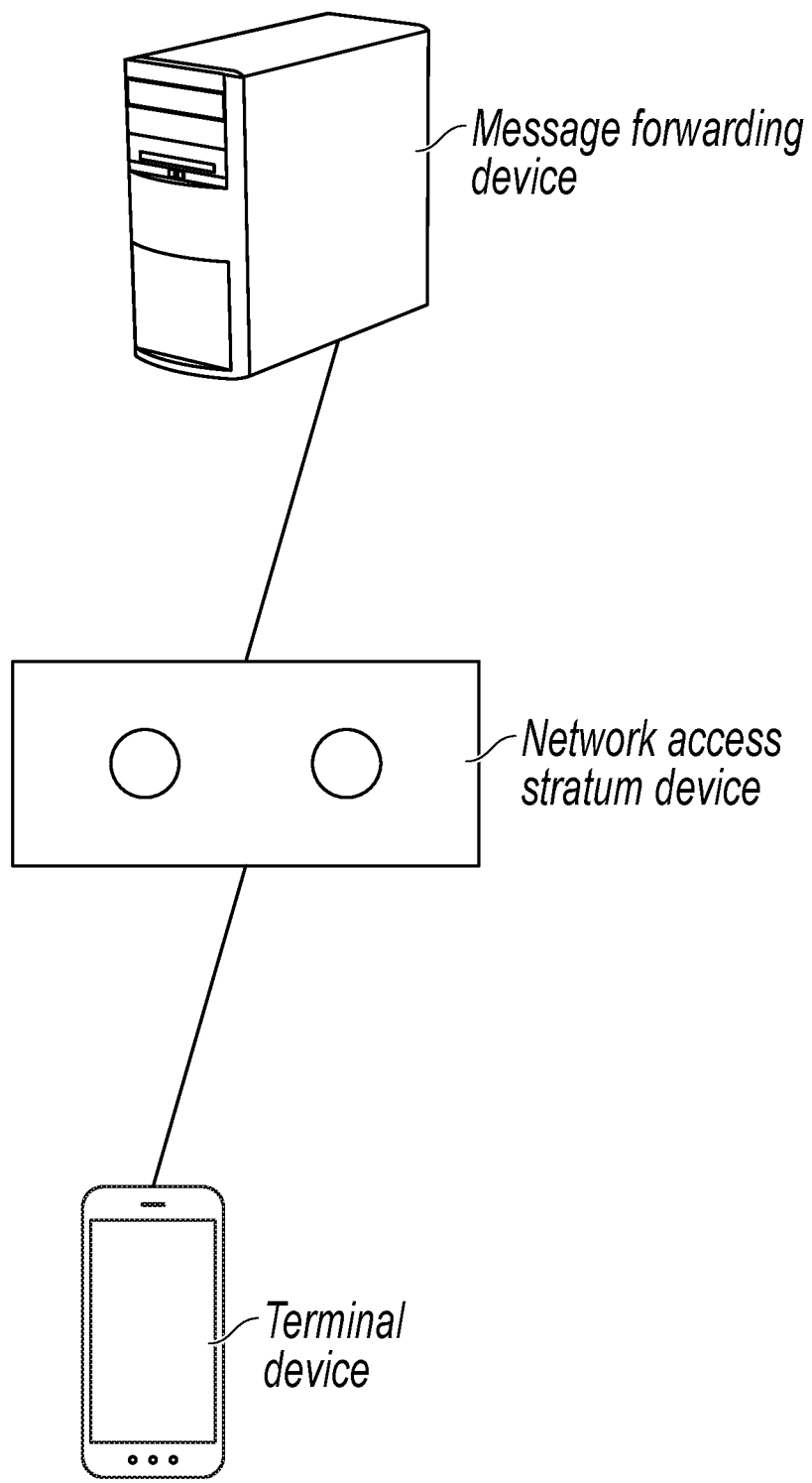
FIG. 2 is an implementation of an information processing system, according to the present specification.

As shown in FIG. 2, an information processing system corresponding to the information processing method in the implementations of the present specification can include a terminal device, a network access stratum device, and a message forwarding device (for example, an IoT HUB). A persistent connection is maintained between the network access stratum device and the terminal device, and a short connection is maintained between the network access stratum device and the message forwarding device. The persistent connection can be a Transmission Control Protocol (TCP) connection between two devices that is kept uninterrupted, and can be used to perform duplex communication (that is, bidirectional data transmission can be allowed between the two devices). The short connection can be a TCP connection that needs to be established for communication for each request between devices. The method can specifically include the following steps:

In step S102, receive an uplink message sent by the terminal device.

The terminal device can be a terminal device used by a user, and the terminal device can be a device such as a personal computer, or can be a mobile terminal device such as a mobile phone or a tablet computer. The uplink message can be any information sent by the terminal device, and content of the uplink message can be different based on different information usages, for example, request information of a certain service, certain instruction information, or a certain message.

During implementation, with continuous development of terminal devices and network technologies, all devices are connected to a network, thereby implementing functions such as device interconnection and remote control, which becomes a current development trend. In an Internet of Things service system, because of service needs such as message pushing, a large quantity of terminal devices in the Internet of Things need to maintain a persistent network connection to a server. In current Internet of Things service solutions, a persistent network connection is maintained between terminals and an IoT HUB. Maintaining a persistent network connection causes relatively large resource overheads on the server. Heartbeat processing, memory overheads on the server, etc. cause performance downgrading of an IoT HUB system responsible for message processing. As such, memory overheads and heartbeat maintenance overheads of the IoT HUB are excessively high, especially in hundreds of millions of IoT scenarios. To alleviate this problem, this implementation of the present specification provides a dual-layer IoT gateway architecture. A persistent connection of a terminal device is maintained by using a high-performance network access stratum. In addition, an uplink message of the terminal device is converted into a target message corresponding to a short connection, and the target message is sent to an IoT HUB, so message processing and network connection processing of the IoT HUB are decoupled, thereby improving IoT HUB system performance, which can specifically include the following content:

A certain application program, such as an instant messaging application program, a music playback application program, or a data storage application program can be installed on the terminal device. When the user needs to perform a certain service, the user can find an application program corresponding to the service in application programs installed in the terminal device, and start the application program. The application program can provide a related service for the user. Different services can be triggered by corresponding keys or links in the application program. For example, when the user clicks a certain key in the application program, the terminal device executes a function corresponding to the key. For example, if the user clicks a download key in the application program, the terminal device can obtain a to-be-downloaded file and download the file. When the user triggers a key or link in the application program and needs to send an uplink message to the message forwarding device, the terminal device can obtain related content of the key or link, and can generate an uplink message based on the obtained related content. Then, based on the persistent connection between the network access stratum device and the terminal device, the terminal device sends the uplink message to the network access stratum device, and the network access stratum device can receive the uplink message.

In step S104, encapsulate the uplink message and a session identifier of the persistent connection maintained between the network access stratum device and the terminal device into a target message corresponding to a short connection.

The target message can be information corresponding to a short connection, and the target message and main content of the uplink message can be the same. For example, the uplink message is a request message for obtaining information A, and the target message can also be a request message for obtaining information A corresponding to a short connection. The session identifier can be an identifier of a persistent connection between two devices, or can be referred to as a connection identifier, etc. The session identifier can be a unique identifier of a persistent connection established between devices.

During implementation, because a persistent connection is maintained between the terminal device and the network access stratum device, the uplink message sent by the terminal device to the network access stratum device should also be a message corresponding to a persistent connection. In addition, there is a certain difference between a message corresponding to a persistent connection and a message corresponding to a short connection. Therefore, the uplink message needs to be encapsulated into a target message corresponding to a short connection. As such, the message forwarding device can identify and process the target message. Specifically, after receiving the uplink message sent by the terminal device, the network access stratum device can encapsulate the uplink message into a target message corresponding to a short connection based on a predetermined message conversion rule or a message encapsulation rule. The message conversion rule or the message encapsulation rule can be set based on actual situations, and is not limited in the implementations of the present specification.

In addition, there may be multiple terminal devices that are persistently connected to the network access stratum device. To distinguish between the persistent connections, a unique identifier (that is, a session identifier) can be set for a persistent connection established between the terminal device and the network access stratum device. As such, a terminal device that is persistently connected to the network access stratum device can be easily found. To mart a terminal device from which the uplink message is sent, when the uplink message is encapsulated into the target message corresponding to a short connection, the session identifier of the persistent connection between the terminal device and the network access stratum device can also be encapsulated into the target message. As such, the target message can include the session identifier of the persistent connection between the terminal device and the network access stratum device, etc.

In step S106, send the target message to the message forwarding device, and receive a downlink message corresponding to the target message and sent by the message forwarding device, where the downlink message includes the session identifier.

The downlink message can be a message for the uplink message, and can be specifically a corresponding message of the uplink message, or can be a notification message obtained after the uplink message is executed. The message forwarding device can be a message forwarding device of a certain service, etc. The message forwarding device can include an Internet of Things forwarding device, that is, an IoT HUB.

During implementation, after receiving the uplink message and encapsulating the uplink message into the target message, the network access stratum device can send the target message to the message forwarding device based on a short connection between the network access stratum device and the message forwarding device. The message forwarding device can analyze and process the target message. After completing processing, the message forwarding device can generate a downlink message by using the processed related information. To determine a terminal device to which the downlink message is sent, the session identifier of the persistent connection between the terminal device and the network access stratum device can be written into the downlink message. The downlink message can be sent to the network access stratum device based on the short connection between the network access stratum device and the message forwarding device. The network access stratum device can receive the downlink message sent by the message forwarding device.

In step S108, determine a receiving device of the downlink message based on the session identifier.

During implementation, after receiving the downlink message, the network access stratum device can analyze the downlink message, and can extract the session identifier from the downlink message. The network access stratum device pre-stores session identifiers for currently establishing persistent connections to terminal devices. The extracted session indenter can be matched and compared with the session identifiers pre-stored on the network access stratum device to determine whether the extracted session identifier exists in the pre-stored session identifiers if the extracted session identifier exists, a corresponding persistent connection can be determined by using the session identifier. Further, a corresponding terminal device can be obtained by using the determined persistent connection, and the obtained terminal device can be determined as the receiving device of the downlink message.

In step S110, send the downlink message to the terminal device corresponding to the session identifier.

During implementation, after determining the receiving device of the downlink message, the network access stratum device can send the downlink message to the determined receiving device, that is, the network access stratum device can send the downlink message to the terminal device corresponding to the session identifier.

Figure 3:
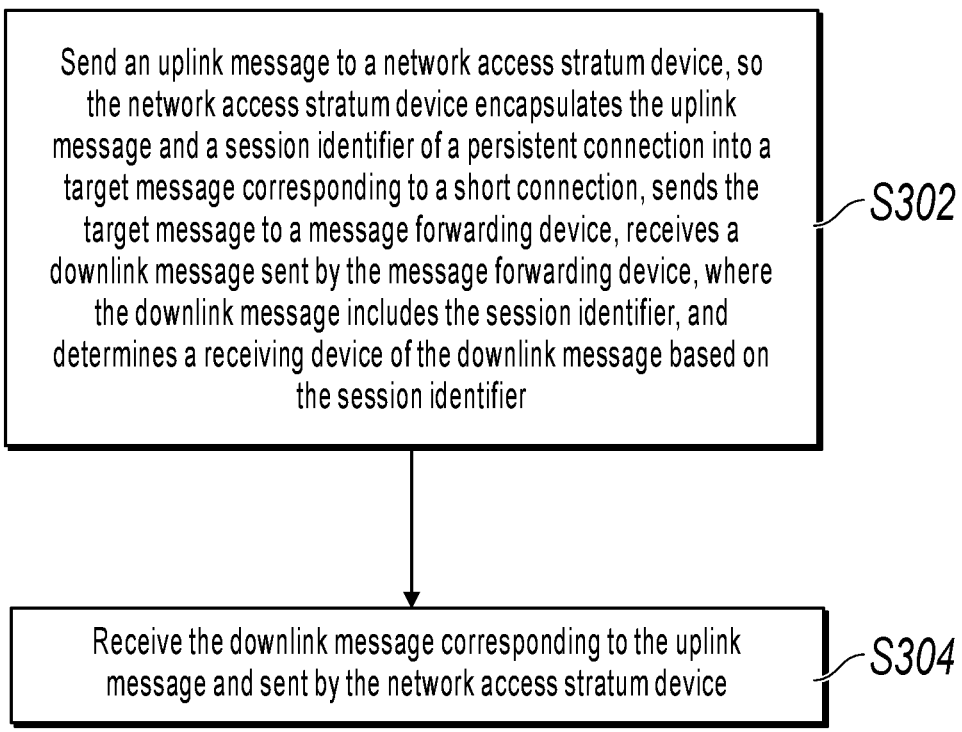
FIG. 3 is an implementation of another information processing method, according to the present specification.

As shown in FIG. 3, implementations of the present specification provide an information processing method. The method can be executed by a terminal device. The terminal device can be a device such as a personal computer, or can be a mobile terminal device such as a mobile phone or a tablet computer. The terminal device can be a terminal device used by a user. The method can be used to alleviate a problem that a terminal device in a network such as the Internet of Things needs to maintain a persistent connection to a service message forwarding device etc., which causes relatively large resource consumption of the service message forwarding device.

As shown in FIG. 2, an information processing system corresponding to the information processing method in this implementation of the present specification can include a terminal device, a network access stratum device, and a message forwarding device. A persistent connection is maintained between the network access stratum device and the terminal device, and a short connection is maintained between the network access stratum device and the message forwarding device. The persistent connection can be a Transmission Control Protocol (TCP) connection between two devices that is kept uninterrupted, and can be used to perform duplex communication (that is, bidirectional data transmission can be allowed between the two devices). The short connection can be a TCP connection that needs to be established for communication for each request between devices. The method can specifically include the following steps:

In step S302, send an uplink message to the network access stratum device, so the network access stratum device encapsulates the uplink message and a session identifier of the persistent connection maintained between the terminal device and the network access stratum device into a target message corresponding to a short connection, sends the target message to a message forwarding device, receives a downlink message sent by the message forwarding device, where the downlink message includes the session identifier, and determines a receiving device of the downlink message based on the session identifier.

In step S304, receive the downlink message corresponding to the uplink message and sent by the network access stratum device.

For a specific processing process of step S302 and step S304, refer to related content of step S102 to step S110. Details are omitted here for simplicity.

Figure 4:
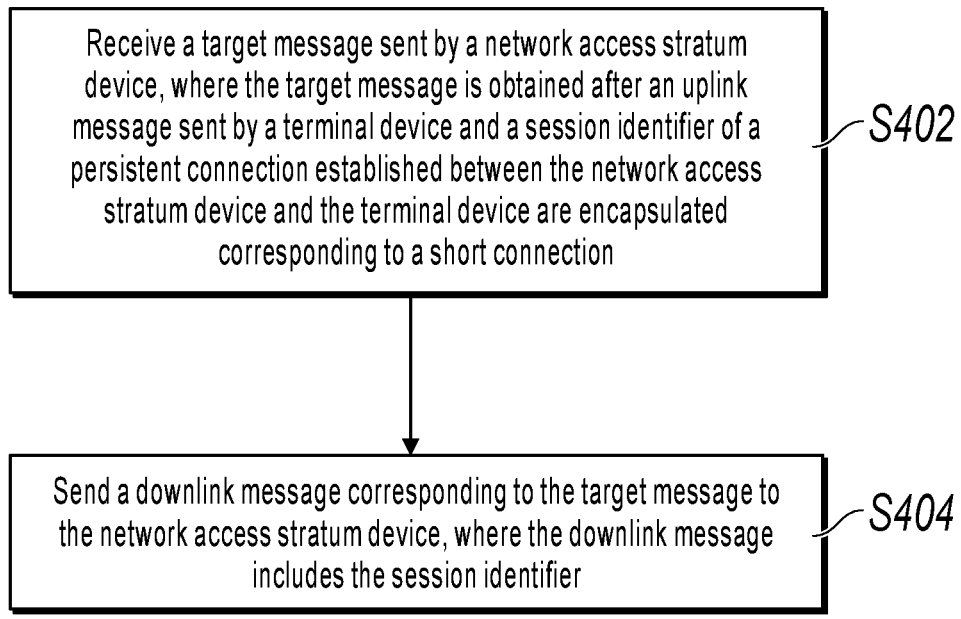
FIG. 4 is an implementation of still another information processing method, according to the present specification.

As shown in FIG. 4, implementations of the present specification provide an information processing method. The method can be executed by a message forwarding device. The message forwarding device can be a standalone server, or can be a server cluster including multiple servers. In addition, the message forwarding device can be a message forwarding device in an Internet of Things, and the message forwarding device can have functions such as information receiving and sending, and information processing. The method can be used to alleviate a problem that a terminal device in a network such as the Internet of Things needs to maintain a persistent connection to a message forwarding device etc., which causes relatively large resource consumption of the message forwarding device.

As shown in FIG. 2, an information processing system corresponding to the information processing method in this implementation of the present specification can include a terminal device, a network access stratum device, and a message forwarding device (for example, an IoT HUB). A persistent connection is maintained between the network access stratum device and the terminal device, and a short connection is maintained between the network access stratum device and the message forwarding device. The persistent connection can be a Transmission Control Protocol (TCP) connection between two devices that is kept uninterrupted, and can be used to perform duplex communication (that is, bidirectional data transmission can be allowed between the two devices). The short connection can be a TCP connection that needs to be established for communication for each request between devices. The method can specifically include the following steps:

In step S402, receive a target message sent by the network access stratum device, where the target message is obtained after an uplink message sent by a terminal device and a session identifier of a persistent connection established between the network access stratum device and the terminal device are encapsulated corresponding to a short connection.

In step S404, send a downlink message corresponding to the target message to the network access stratum device, where the downlink message includes the session identifier.

For a specific processing process of step S402 and step S404, refer to related content of step S102 to step S110. Details are omitted here for simplicity.

This implementation of the present specification provides an information processing method, applied to the network access stratum device. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier; determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state. When the message forwarding device pushes a downlink message, the network access stratum device can correctly find a corresponding terminal device and push the downlink message.

Implementation 2

Figure 5:
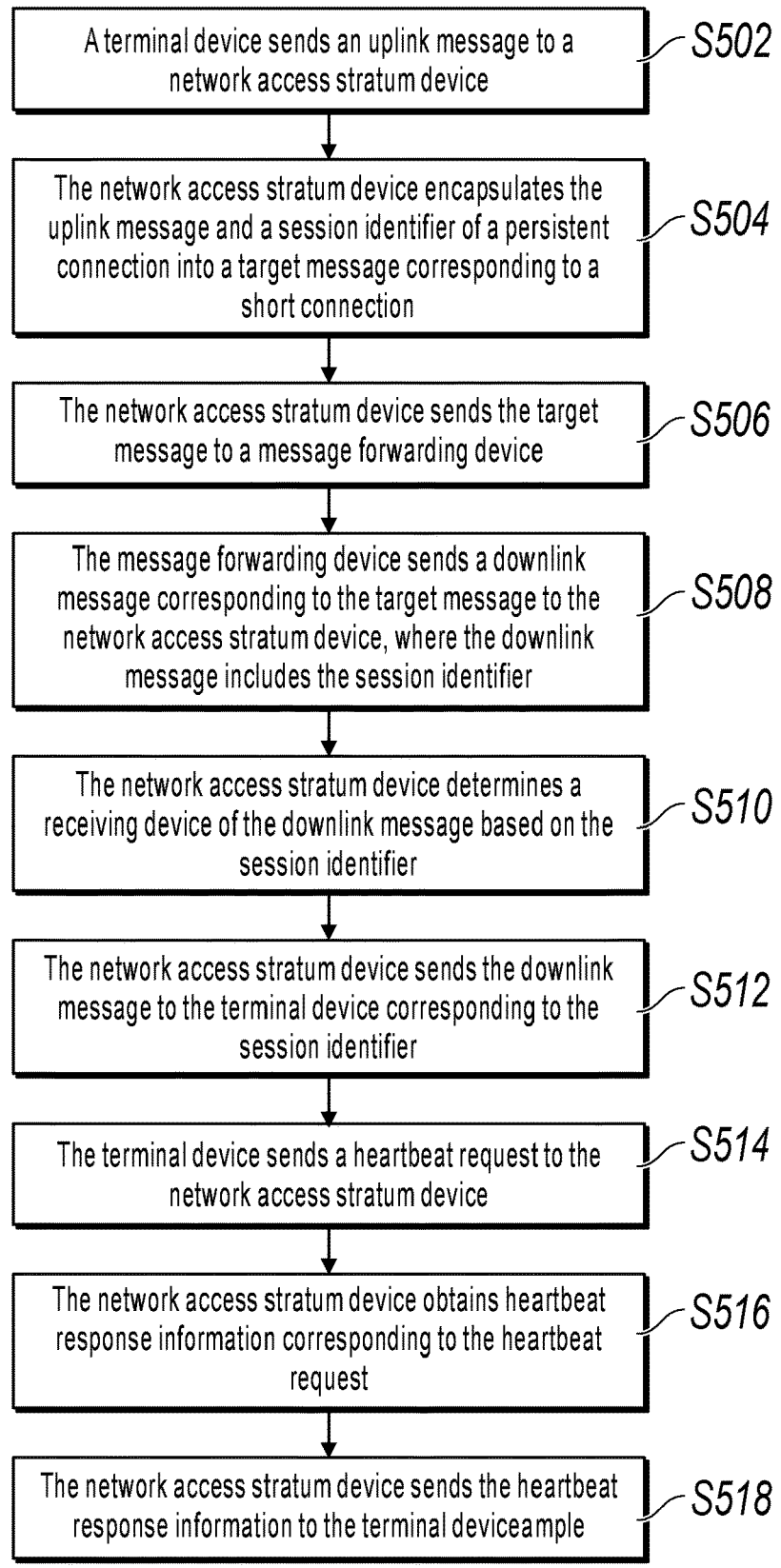
FIG. 5 is an implementation of still another information processing method, according to the present specification.

As shown in FIG. 5, implementations of the present specification provide an information processing method. The method can be jointly executed by a network access stratum device, a terminal device, and a message forwarding device. The network access stratum device can be a terminal device or a server. The terminal device can be a device such as a personal computer, or can be a mobile terminal device such as a mobile phone or a tablet computer. The terminal device can be a terminal device used by a user. The server can be a standalone server, or can be a server cluster including multiple servers. In addition, the message forwarding device can be a forwarding device in the Internet of Things, etc. The message forwarding device can have functions such as information receiving and sending, and information processing. The method can be used to alleviate a problem that a terminal device in a network such as the Internet of Things needs to maintain a persistent connection to a message forwarding device etc., which causes relatively large resource consumption of the message forwarding device.

An information processing system corresponding to the information processing method in this implementation of the present specification can include a terminal device, a network access stratum device, and a message forwarding device. A persistent connection is maintained between the network access stratum device and the terminal device, and a short connection is maintained between the network access stratum device and the message forwarding device. The persistent connection can be a Transmission Control Protocol (TCP) connection between two devices that is kept uninterrupted, and can be used to perform duplex communication (that is, bidirectional data transmission can be allowed between the two devices). The short connection can be a TCP connection that needs to be established for communication for each request between devices. The method can specifically include the following steps.

In step S502, the terminal device sends an uplink message to the network access stratum device.

A time domain session mechanism can be set in the network access stratum device. The session mechanism can refer to a mechanism in which a terminal device communicates with an interaction system at a time interval. Generally, the time interval can refer to a time elapsed between entering the interaction system and logging out of the interaction system. For example, when a user browses a website, the time elapsed between entering the website and closing the browser, that is, the time spent by the user to browse the website is the session mechanism. The session mechanism in this implementation of the present specification can be a mechanism associated with a network protocol. In this case, the session mechanism can imply connection-oriented and/ or state holding. The connection-oriented can be that a communication channel needs to be established by both communication parties before communication. The state holding can be that one communication party can associate a series of messages, so messages can be interdependent.

When the network access stratum device needs to create a session for a request of a certain terminal device, the network access stratum device can first detect whether the request of the terminal device includes a session identifier, which can be referred to as a session ID. If the request of the terminal device includes a session ID, it can indicate that a session is previously created for the terminal device. In this case, the network access stratum device can retrieve and use the session based on the session ID (if the session ID cannot be retrieved, a session ID can be recreated). If the request of the terminal device does not include a session ID, a session is created for the terminal device, and a session ID associated with the session is generated. A value of the session ID can be a character string that is neither repeated nor easy to forge. A session in the network access stratum device can store information such as a status of each TCP connection.

One session corresponding to a persistent connection between each terminal device and the network access stratum device exists in the network access stratum device, and each session is allocated a unique session ID to uniquely determine a corresponding persistent connection.

In step S504, the network access stratum device encapsulates the uplink message and a session identifier of the persistent connection maintained between the network access stratum device and the terminal device into a target message corresponding to a short connection.

In step S506, the network access stratum device sends the target message to the message forwarding device.

In step S508, the message forwarding device sends a downlink message corresponding to the target message to the network access stratum device where the downlink message includes the session identifier.

In step S510, the network access stratum device determines a receiving device of the downlink message based on the session identifier.

In step S512, the network access stratum device sends the downlink message to the terminal device corresponding to the session identifier.

For a specific processing process of step S502 to step S512, refer to related content of step S102 to step S110 in Implementation 1. Details are omitted here for simplicity.

In addition, the terminal device can maintain a persistent connection to the network access stratum device by using heartbeats. For details, refer to related content in the following steps S514 to S518.

In step S514, the terminal dev ice sends a heartbeat request to the network access stratum device.

The heartbeat request can be implemented in multiple ways, such as PINGREQ (PING Request).

During implementation, to quickly sense a persistent connection state between the terminal device and the network access stratum device, the terminal device can send a heartbeat request to the network access stratum device, so as to determine whether the terminal device and the network access stratum device are still in a persistent connection state.

It is worthwhile to note that, in practice, the processing in step S514 can be performed periodically. Correspondingly, the processing in step S514 can be: sending a heartbeat request to the network access stratum device when a predetermined heartbeat detection period is reached. The heartbeat detection period can be set based on actual situations, for example, 30 seconds or 1 minute.

In step S516, the network access stratum device obtains heartbeat response information corresponding to the heartbeat request.

The heartbeat response information can be implemented in multiple ways, such as PINGRSP (PING Response). The heartbeat response information can include information about whether the terminal device and the network access stratum device are still in a persistent connection state.

In step S518, the network access stratum device sends the heartbeat response information to the terminal device.

In addition to actively obtaining the heartbeat information by using the terminal device, the network access stratum device can actively report a heartbeat status of the terminal device. Corresponding processing can include: obtaining the heartbeat information of the terminal device, and sending the heartbeat information to the terminal device; or when a predetermined heartbeat reporting period is reached, obtaining the heartbeat information of the terminal device, and sending the heartbeat information to the terminal device. The heartbeat reporting period can be set based on actual situations for example, 30 seconds or 10 seconds.

It is worthwhile to note that, by means of processing in steps S514 to S518, the network access stratum device is responsible for uninstalling an encryption request initiated by the terminal device, maintaining a persistent connection to the terminal device, and is responsible for keep-alive management of the persistent connection. Heartbeat processing of the terminal device is implemented on the network access stratum device. As such, the message forwarding device can reduce a large amount of heartbeat processing consumption, and the network access stratum device, as a network packet processing device, has relatively high performance. As such, persistent connection maintenance is also more efficient.

In addition, a sequence relationship does not have to exist between the processing in step S502 to step S512 and the processing in step S514 to step S518. That is, the processing in step S514 to step S518 can be performed first, and then the processing in step S502 to step S512 is performed, or the processing in step S514 to step S518 and the processing in step S502 to step S512 can be performed simultaneously.

This implementation of the present specification provides an information processing method. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier; determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state. When the message forwarding device pushes a downlink message, the network access stratum device can correctly find a corresponding terminal device and push the downlink message.

Implementation 3

Figure 6:
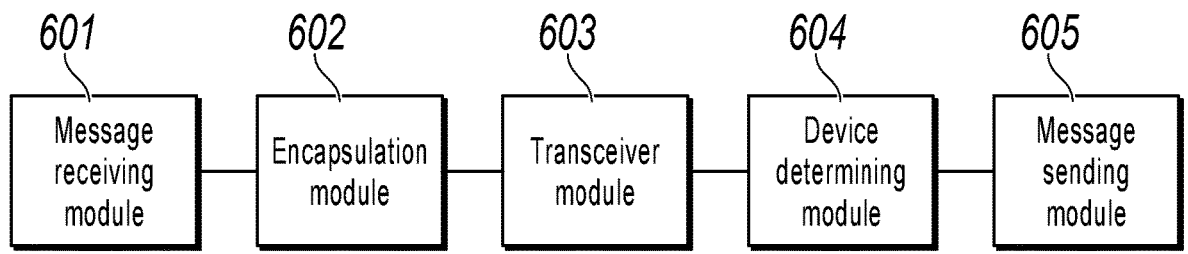
FIG. 6 is an implementation of an information processing apparatus, according to the present specification.

The previous describes the information processing method provided in the implementations of the present specification. Implementations of the present specification further provide an information processing apparatus based on the same idea, as shown in FIG. 6.

A persistent connection is maintained between the information processing apparatus and a terminal device, and a short connection is maintained between the apparatus and a message forwarding device. The apparatus includes a message receiving module 601, an encapsulation module 602, a transceiver module 603, a device determining module 604, and a message sending module 605.

The message receiving module 601 is configured to receive an uplink message sent by the terminal device; the encapsulation module 602 is configured to encapsulate the uplink message and a session identifier of the persistent connection maintained between the network access stratum device and the terminal device into a target message corresponding to a short connection; the transceiver module 603 configured to send the target message to the message forwarding device, and receive a downlink message corresponding to the target message and sent by the message forwarding device, where the downlink message includes the session identifier; the device determining module 604 is configured to determine a receiving device of the downlink message based on the session identifier and the message sending module 605 is configured to send the downlink message to the terminal device corresponding to the session identifier.

In this implementation of the present specification, the apparatus further includes, a request receiving module, configured to receive a heartbeat request sent by the terminal device, a response acquisition module, configured to obtain heartbeat response information corresponding to the heartbeat request and a response information sending module, configured to send the heartbeat response information to the terminal device.

In this implementation of the present specification, the apparatus further includes: a heartbeat acquisition module, configured to obtain heartbeat information of the terminal device when a predetermined heartbeat reporting period is reached; and a heartbeat sending module, configured to send the heartbeat information to the terminal device.

This implementation of the present specification provides an information processing apparatus, and the information processing apparatus can be a network access stratum device. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier, determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state. When the message forwarding device pushes a downlink message, the network access stratum device can correctly find a corresponding terminal device and push the downlink message.

Implementation 4

Figure 7:
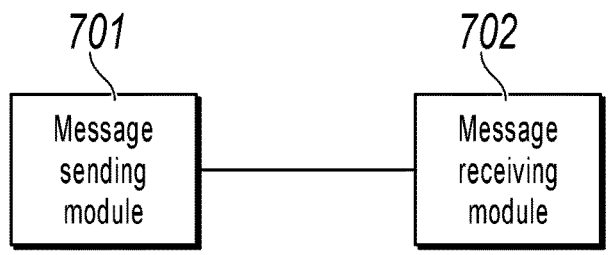
FIG. 7 is an implementation of another information processing apparatus, according to the present specification.

Based on the same idea, implementations of the present specification further provide an information processing apparatus, as shown in FIG. 7.

A persistent connection is maintained between the information processing apparatus and a network access stratum device, and the apparatus includes a message sending module 701 and a message receiving module 702.

The message sending module 701 is configured to send an uplink message to the network access stratum device, so the network access stratum device encapsulates the uplink message and a session identifier of the persistent connection maintained between the apparatus and the network access stratum device into a target message corresponding to a short connection, sends the target message to a message forwarding device, receives a downlink message sent by the message forwarding device, where the downlink message includes the session identifier, and determines a receiving device of the downlink message based on the session identifier; and the message receiving module 702 is configured to receive the downlink message corresponding to the uplink message and sent by the network access stratum device.

In this implementation of the present specification, the apparatus further includes: a request sending module, configured to send a heartbeat request to the network access stratum device; and a response information receiving module, configured to receive heartbeat response information corresponding to the heartbeat request and sent by the network access stratum device.

In the implementations of the present specification, the request sending module is configured to send a heartbeat request to the network access stratum device when a predetermined heartbeat detection period is reached.

This implementation of the present specification provides an information processing apparatus, and the information processing apparatus can be a terminal device. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier; determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state. When the message forwarding device pushes a downlink message, the network access stratum device can correctly find a corresponding terminal device and push the downlink message.

Implementation 5

Figure 8:
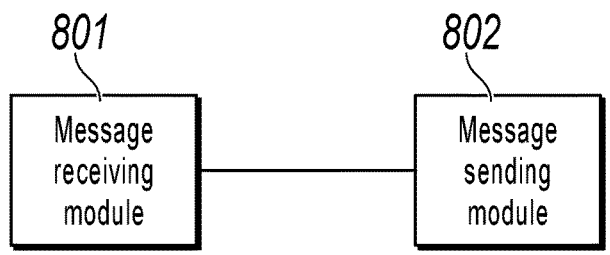
FIG. 8 is an implementation of still another information processing apparatus, according to the present specification.

Based on the same idea, implementations of the present specification further provide an information processing apparatus, as shown in FIG. 8.

A short connection is maintained between the information processing apparatus and a network access stratum device, and the apparatus includes a message receiving module 801 and a message sending module 802.

The message receiving module 801 is configured to receive a target message sent by the network access stratum device, where the target message is obtained after an uplink message sent by a terminal device and a session identifier of a persistent connection established between the network access stratum device and the terminal device are encapsulated corresponding to a short connection; and the message sending module 802 is configured to send a downlink message corresponding to the target message to the network access stratum device, where the downlink message includes the session identifier.

Implementations of the present specification provide an information processing apparatus. The information processing apparatus can be a message forwarding device. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier; determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state. When the message forwarding device pushes a downlink message, the network access stratum device can correctly find a corresponding terminal device and push the downlink message.

Implementation 6

Figure 9:
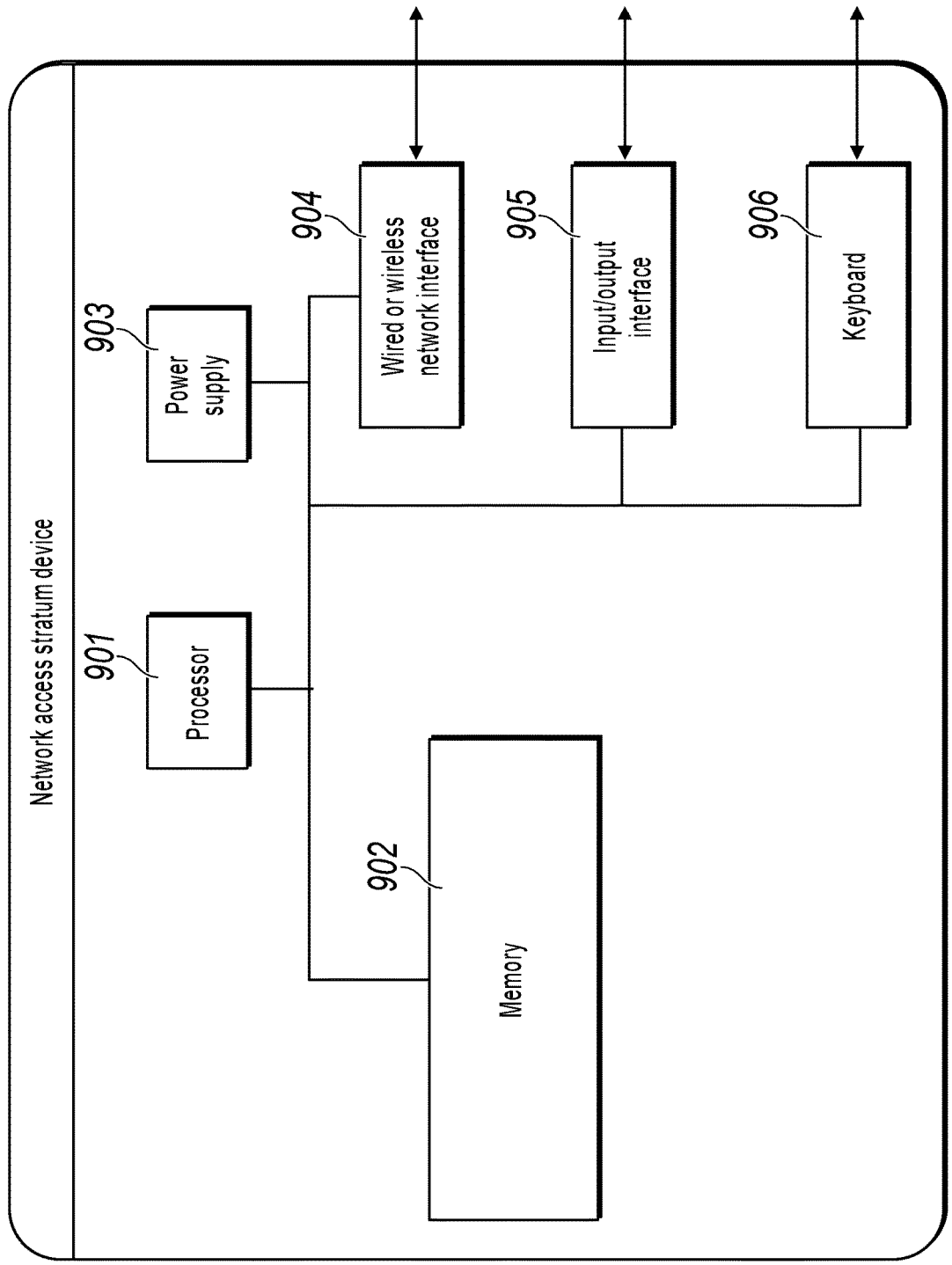
FIG. 9 is an implementation of a network access stratum device, according to the present specification.

The previous describes the information processing apparatus provided in the implementations of the present specification. Implementations of the present specification further provide a network access stratum device based on the same idea, as shown in FIG. 9.

The network access stratum device can be a terminal device or a server provided in the previous implementation. A persistent connection is maintained between the network access stratum device and the terminal device, and a short connection is maintained between the network access stratum device and the message forwarding device.

The network access stratum device can vary greatly based on configuration or performance, and can include one or more processors 901 and a memory 902. The memory 902 can store one or more storage applications or data. The memory 902 can be used for transient storage or persistent storage. The applications stored in the memory 902 can include one or more modules (not shown in the figure), and each module can include a series of computer executable instructions for the network access stratum device. Further, the processor 901 can be configured to communicate with the memory 902, and execute a series of computer executable instructions in the memory 902 on the network access stratum device. The network access stratum device can further include one or more power supplies 93, one or more wired or wireless network interfaces 904, one or more input/output interfaces 905, and one or more keyboards 906.

Specifically, in this implementation, the network access stratum device includes a memory and one or more programs. The one or more programs are stored in the memory. The one or more programs can include one or more modules. Each module can include a series of computer executable instructions for the network access stratum device. The one or more processors are configured to execute the following computer executable instructions included in the one or more programs: receiving an uplink message sent by the terminal device; encapsulating the uplink message and a session identifier of the persistent connection maintained between the network access stratum device and the terminal device into a target message corresponding to a short connection; sending the target message to the message forwarding device, and receiving a downlink message corresponding to the target message and sent by the message forwarding device, where the downlink message includes the session identifier; determining a receiving device of the downlink message based on the session identifier; and sending the downlink message to the terminal device corresponding to the session identifier.

In this implementation of the present specification, the instructions further include: receiving a heartbeat request sent by the terminal device, obtaining heartbeat response information corresponding to the heartbeat request; and sending the heartbeat response information to the terminal device.

In this implementation of the present specification, the instructions further include: obtaining heartbeat information of the terminal device when a predetermined heartbeat reporting period is reached; and sending the heartbeat information to the terminal device.

This implementation of the present specification provides a network access stratum device. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier; determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state. When the message forwarding device pushes a downlink message, the network access stratum device can correctly find a corresponding terminal device and push the downlink message.

Implementation 7

Figure 10:
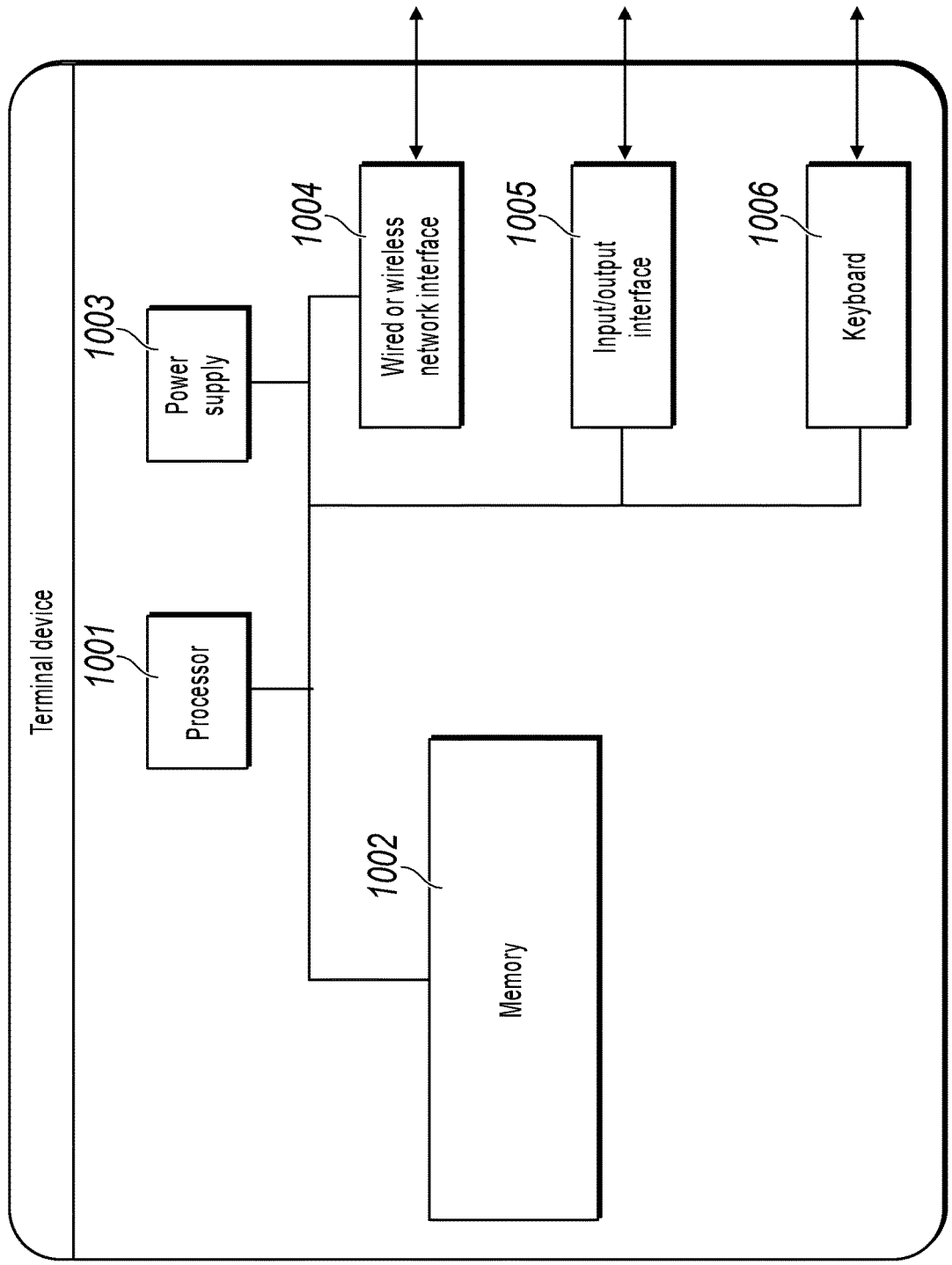
FIG. 10 is an implementation of a terminal device according to the present specification.

Based on the same idea, implementations of the present specification further provide a terminal device, as shown in FIG. 10.

A persistent connection is maintained between the terminal device and a network access stratum device.

The terminal device can vary greatly based on configuration or performance, and can include one or more processors 1001 and a memory 1002. The memory 1002 can store one or more storage applications or data. The memory 1002 can be used for transient storage or persistent storage. The applications stored in the memory 1002 can include one or more modules (not shown in the figure), and each module can include a series of computer executable instructions for the terminal device. Further, the processor 1001 can be configured to communicate with the memory 1002, and execute a series of computer executable instructions in the memory 1002 on the terminal device. The terminal device can further include one or more power supplies 1003, one or more wired or wireless network interfaces 1004, one or more input/output interfaces 105, and one or more keyboards 1006.

Specifically, in this implementation, the terminal device includes a memory and one or more programs. The one or more programs are stored in the memory. The one or more programs can include one or more modules. Each module can include a series of computer executable instructions for the terminal device. The one or more processors are configured to execute the following computer executable instructions included in the one or more programs: sending an uplink message to the network access stratum device, so the network access stratum device encapsulates the uplink message and a session identifier of the persistent connection maintained between the terminal device and the network access stratum device into a target message corresponding to a short connection, sends the target message to a message forwarding device, receives a downlink message sent by the message forwarding device, where the downlink message includes the session identifier, and determines a receiving device of the downlink message based on the session identifier; and receiving the downlink message corresponding to the uplink message and sent by the network access stratum device.

In this implementation of the present specification, the instructions further include: sending a heartbeat request to the network access stratum device; and receiving heartbeat response information corresponding to the heartbeat request and sent by the network access stratum device.

In the implementations of the present specification, sending a heartbeat request to the network access stratum device includes: sending a heartbeat request to the network access stratum device when a predetermined heartbeat detection period is reached.

Tis implementation of the present specification provides a terminal device. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier; determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state. When the message forwarding device pushes a downlink message, the network access stratum device can correctly find a corresponding terminal device and push the downlink message.

Implementation 8

Figure 11:
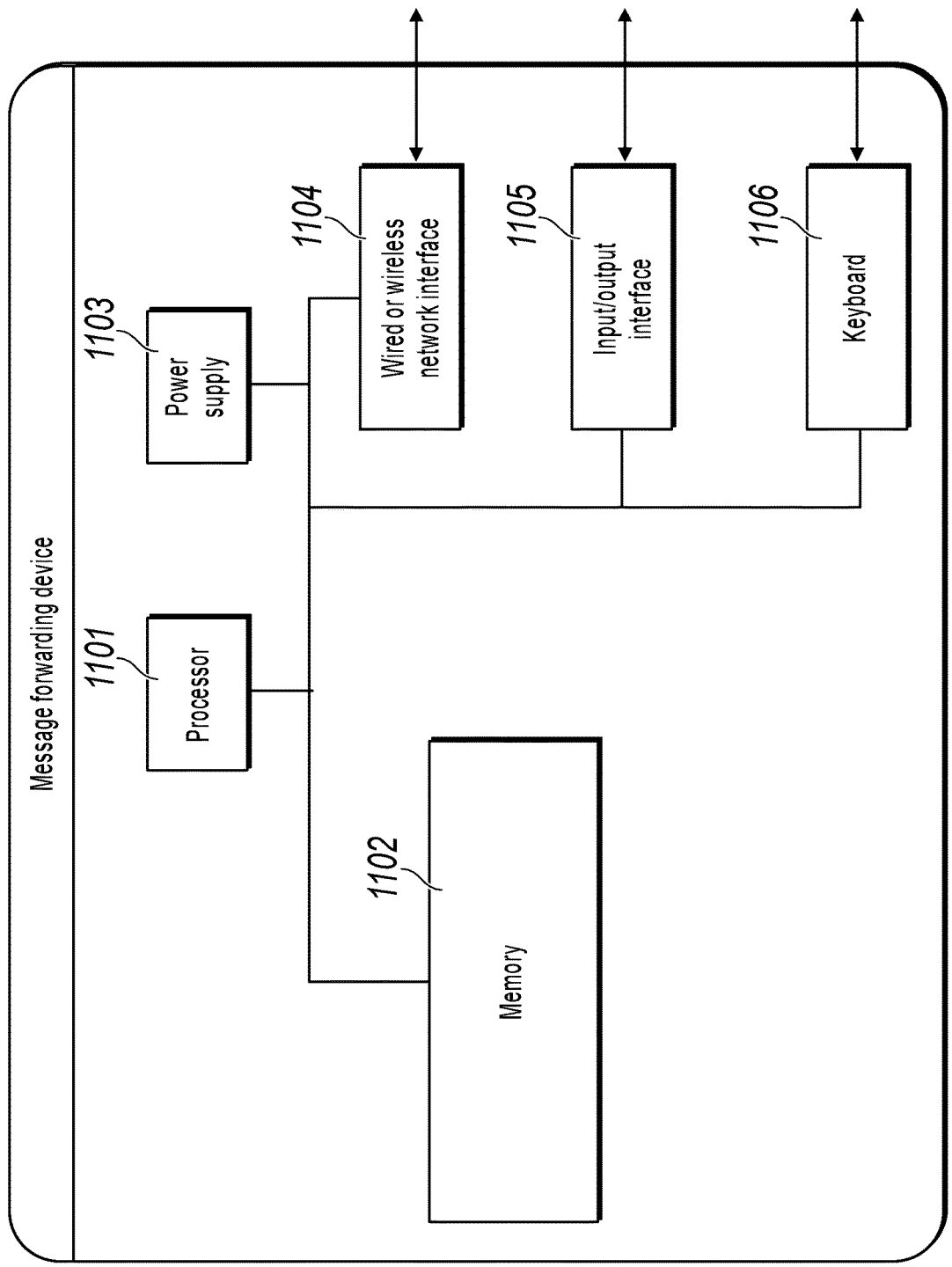
FIG. 11 is an implementation of a message forwarding device according to the present specification.

Based on the same idea, implementations of the present specification further provide a message forwarding device, as shown in FIG. 11.

A short connection is maintained between the message forwarding device and a network access stratum device.

The message forwarding device can vary greatly based on configuration or performance, and can include one or more processors 1101 and a memory 1102. The memory 1102 can store one or more storage applications or data. The memory 1102 can be used for transient storage or persistent storage. The applications stored in the memory 1102 can include one or more modules (not shown in the figure), and each module can include a series of computer executable instructions for the message forwarding device. Further, the processor 1101 can be configured to communicate with the memory 1102, and execute a series of computer executable instructions in the memory 102 on the message forwarding device. The message forwarding device can further include one or more power supplies 1103, one or more wired or wireless network interfaces 1104, one or more input/output interfaces 1105, and one or more key boards 1106.

Specifically, in this implementation, the message forwarding device includes a memory and one or more programs. The one or more programs are stored in the memory. The one or more programs can include one or more modules. Each module can include a series of computer executable instructions for the message forwarding device. The one or more processors are configured to execute the following computer executable instructions included in the one or more programs: receiving a target message sent by the network access stratum device, where the target message is obtained after an uplink message sent by a terminal device and a session identifier of a persistent connection established between the network access stratum device and the terminal device are encapsulated corresponding to a short connection; and sending a downlink message corresponding to the target message to the network access stratum device, where the downlink message includes the session identifier.

Implementations of the present specification provide a message forwarding device. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier; determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state.

When the message forwarding device pushes a downlink message, the network access stratum device can correctly find a corresponding terminal device and push the downlink message.

Implementation 9

Figure 12:
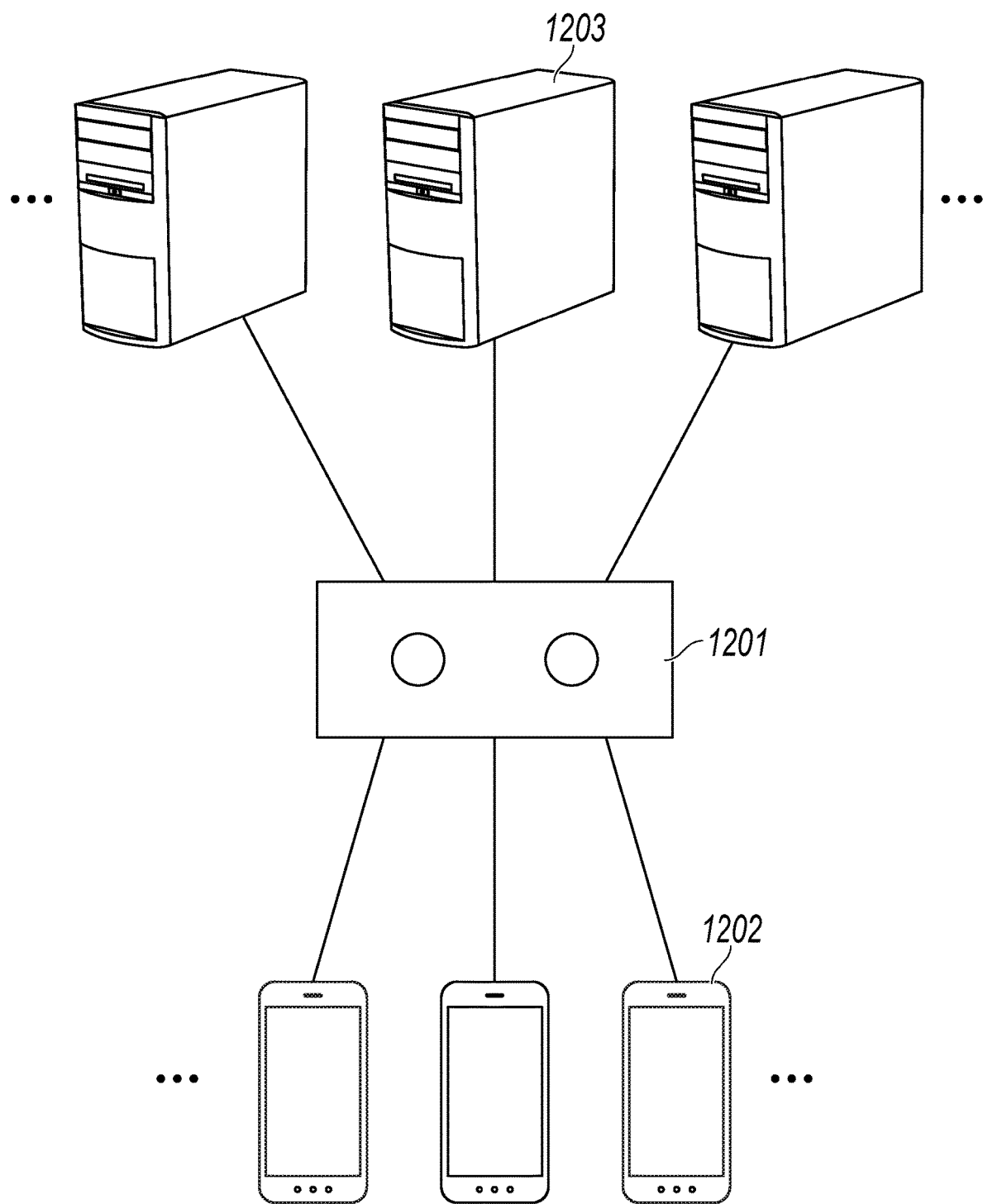
FIG. 12 is an implementation of an information processing system, according to the present specification.

Based on the same idea, implementations of the present specification further provide an information processing system, as shown in FIG. 12. The system includes a network access stratum device 1201, a terminal device 1202, and a message forwarding device 1203.

A persistent connection is maintained between the network access stratum device 1201 and the terminal device 1202, and a short connection is maintained between the network access stratum device 1201 and the message forwarding device 1203; the network access stratum device 1201 receives an uplink message sent by the terminal device 1202, the network access stratum device 1201 encapsulates the uplink message and a session identifier of the persistent connection maintained between the network access stratum device and the terminal device into a target message corresponding to a short connection, and sends the target message to the message forwarding device 1203; the network access stratum device 1201 receives a downlink message corresponding to the target message and sent by the message forwarding device 1203, where the downlink message includes the session identifier; and the network access stratum device 1201 determines a receiving device of the downlink message based on the session identifier, and sends the downlink message to the terminal device 1202 corresponding to the session identifier.

In the implementations of the present specification, the network access stratum device 1201 receives a heartbeat request sent by the terminal device 1202; the network access stratum device 1201 obtains heartbeat response information corresponding to the heartbeat request; and the network access stratum device 1201 sends the heartbeat response information to the terminal device 1202.

In the implementations of the present specification, the network access stratum device 1201 obtains heartbeat information of the terminal device 1202 when a predetermined heartbeat reporting period is reached; and the network access stratum device 1201 sends the heartbeat information to the terminal device 1202.

In the implementations of the present specification, the terminal device 1202 sends a heartbeat request to the network access stratum device 1201 when a predetermined heartbeat detection period is reached.

In this implementation of the present specification, as shown in FIG. 12, the network access stratum device 1201 is a standalone device. In this case, there can be multiple terminal devices 1202 and message forwarding devices 1203. A persistent connection is maintained between each terminal device 1202 and the network access stratum device 1201, and a short connection is maintained between each message forwarding device 1203 and the network access stratum device 1201. For a specific processing process, refer to related content in Implementation 1 and Implementation 2. Details are omitted here for simplicity.

Figure 13:
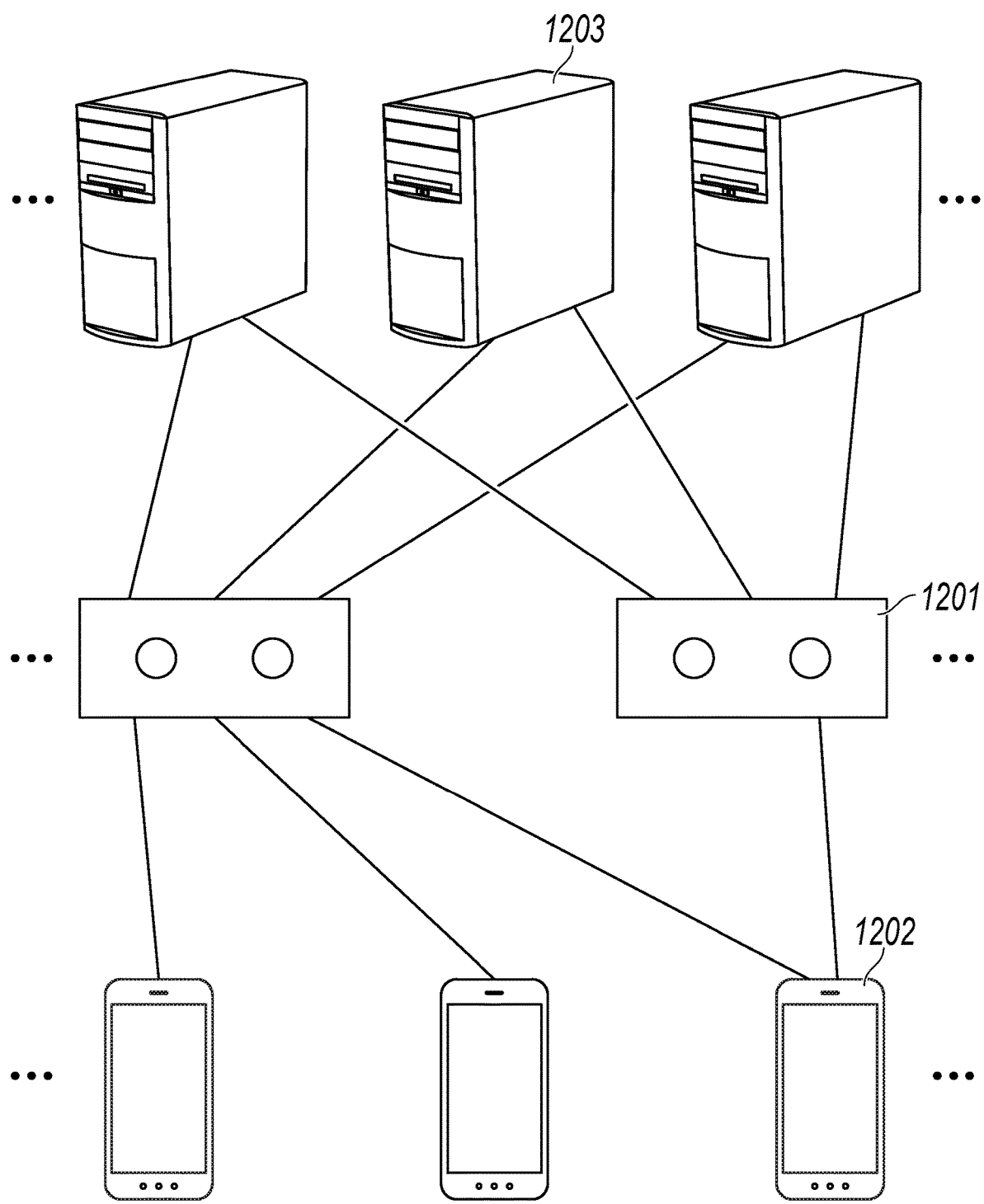
FIG. 13 is an implementation of another information processing system, according to the present specification.

In implementations of the present specification, as shown in FIG. 13, a system includes multiple network access stratum devices 1201, a short connection is maintained between each network access stratum device 1201 and a message forwarding device 1203, and a persistent connection is maintained between at least one network access stratum device 1201 and a terminal device 1202. In this case, there can be multiple terminal devices 1202 and message forwarding devices 1203. A persistent connection is maintained between each terminal device 1203 and the network access stratum device 1201, and each persistent connection includes a corresponding session identifier in the network access stratum device 1201. Therefore, the network access stratum device 1201 can easily find the corresponding terminal device 1202 by using the session identifier. A short connection is maintained between each message forwarding device 1203 and each network access stratum device 1201. For a specific processing process, refer to related content in Implementation 1 and Implementation 2. Details are omitted here for simplicity.

This implementation of the present specification provides an information processing system, including a network access stratum device, a terminal device, and a message forwarding device. A persistent connection is maintained between the network access stratum device and the terminal device, and a short connection is maintained between the network access stratum device and the message forwarding device. The network access stratum device receives an uplink message sent by the terminal device, and then encapsulates the uplink message and a session identifier of the persistent connection maintained between the network access stratum device and the terminal device into a target message corresponding to a short connection; sends the target message to the message forwarding device, and receives a downlink message corresponding to the target message and sent by the message forwarding device, where the downlink message includes the session identifier, determines a receiving device of the downlink message based on the session identifier, and sends the downlink message to the terminal device corresponding to the session identifier. As such, the persistent network connection of the terminal device is kept only between the terminal device and the network access stratum device, so the more efficient network access stratum device is responsible for the management of the persistent network connection, and the message forwarding device is decoupled from network packet processing. Therefore, performance of a message forwarding device system is improved, and resource consumption of the message forwarding device is reduced. In addition, the network access stratum device keeps a persistent connection state. When the message forwarding device pushes a downlink message, the network access stratum device can correctly find a corresponding terminal device and push the downlink message.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD)(for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, in the one or more implementations of the present specification, a function of each unit can be implemented in one or more pieces of software and/or hardware.

A person skilled in the art should understand that implementations of the present specification can be provided as a method, a system, or a computer program product. Therefore, the one or more implementations of the present specification can use a form of hardware only implementations, software only implementations, or implementations with a combination of software and hardware. In addition, the one or more implementations of the present specification can use a form of a computer program product that is implemented on one or more computer-usable storage media (including but not limited to a disk memory, a CD-ROM, an optical memory, etc.) that include computer-usable program code.

The implementations of the present specification are described with reference to the flowcharts and/or block diagrams of the methods, the devices (systems), and the computer program products based on the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPUs), input/output interfaces, network interfaces, and memories.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to further note that, the terms "include", "contain" or their any other variants are intended to cover anon-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that implementations of the present specification can be provided as a method, a system, or a computer program product. Therefore, the one or more implementations of the present specification can use a form of hardware only implementations, soft-ware only implementations, or implementations with a combination of software and hardware. In addition, the one or more implementations of the present specification can use a form of a computer program product that is implemented on one or more computer-usable storage media (including but not limited to a disk memory, a CD-ROM, an optical memory, etc.) that include computer-usable program code.

The one or more implementations of the present specification can be described in common contexts of computer executable instructions executed by a computer, such as a program module. Generally, the program module includes a routine, a program, an object, a component, a data structure, etc. executing a specific task or implementing a specific abstract data type. The one or more implementations of the present specification can also be practiced in distributed computing environments. In the distributed computing environments, tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is similar to a method implementation, and therefore is described briefly. For related pans, references can be made to related descriptions in the method implementation.

The previous implementations are implementations of the present specification, and are not intended to limit the present specification. A person skilled in the art can make various modifications and changes to the present specification. Any modification, equivalent replacement, or improvement made without departing from the spirit and principle of the present specification shall fall within the scope of the claims in the present specification.

What is claimed is:

1. A computer-implemented network communication method, comprising:
   receiving, by a network access stratum device, an uplink message sent by a terminal device, wherein the uplink message is sent over a persistent connection between the network access stratum device and the terminal device;
   in response to receiving the uplink message, establishing, by the network access stratum device, a short-term connection between the network access stratum device and a message forwarding device;
   encapsulating, by the network access stratum device, the uplink message and a session identifier of the persistent connection into a target message;
   transmitting, by the network access stratum device, the target message to the message forwarding device over the short-term connection between the network access stratum device and the message forwarding device;
   receiving, by the network access stratum device, from the message forwarding device, a downlink message corresponding to the target message, wherein the downlink message comprises the session identifier;
   identifying, by the network access stratum device, the terminal device as a receiving device of the downlink message based on the session identifier; and
   sending, by the network access stratum device, the downlink message to the terminal device.

2. The computer-implemented method of claim 1, comprising:
   receiving, by the network access stratum device, a heartbeat request transmission sent by the terminal device;
   obtaining heartbeat response information corresponding to the heartbeat request transmission, the heartbeat response information comprising information about a state of the persistent connection between the network access stratum device and the terminal device; and
   transmitting the heartbeat response information to the terminal device.

3. The computer-implemented method of claim 1, comprising:
   determining, by the network access stratum device, that a predetermined heartbeat reporting period is reached;
   in response to determining that the predetermined heartbeat reporting period is reached, obtaining heartbeat information of the terminal device, the heartbeat information comprising information about a state of the persistent connection between the network access stratum device and the terminal device; and
   sending the heartbeat information to the terminal device.

4. The computer-implemented method of claim 1, wherein receiving the downlink message comprises receiving the downlink message over the short-term connection.

5. The computer-implemented method of claim 1, wherein the message forwarding device comprises an Internet of Things hub.

6. The computer-implemented method of claim 1, wherein one or more other terminal devices are persistently connected to the network access stratum device.

7. A non-transitory, computer-readable medium storing one or more instructions executable by a computer system to perform network communication operations comprising:
   receiving, by a network access stratum device, an uplink message sent by a terminal device, wherein the uplink message is sent over a persistent connection between the network access stratum device and the terminal device;

in response to receiving the uplink message, establishing, by the network access stratum device, a short-term connection between the network access stratum device and a message forwarding device;

encapsulating, by the network access stratum device, the uplink message and a session identifier of the persistent connection into a target message;

transmitting, by the network access stratum device, the target message to the message forwarding device over the short-term connection between the network access stratum device and the message forwarding device;

receiving, by the network access stratum device, from the message forwarding device, a downlink message corresponding to the target message, wherein the downlink message comprises the session identifier;

identifying, by the network access stratum device, the terminal device as a receiving device of the downlink message based on the session identifier; and sending, by the network access stratum device, the downlink message to the terminal device.

8. The non-transitory, computer-readable medium of claim 7, wherein the operations comprise:

receiving, by the network access stratum device, a heartbeat request transmission sent by the terminal device;

obtaining heartbeat response information corresponding to the heartbeat request transmission, the heartbeat response information comprising information about a state of the persistent connection between the network access stratum device and the terminal device; and transmitting the heartbeat response information to the terminal device.

9. The non-transitory, computer-readable medium of claim 7, wherein the operations comprise:

determining, by the network access stratum device, that a predetermined heartbeat reporting period is reached;

in response to determining that the predetermined heartbeat reporting period is reached, obtaining heartbeat information of the terminal device, the heartbeat information comprising information about a state of the persistent connection between the network access stratum device and the terminal device; and sending the heartbeat information to the terminal device.

10. The non-transitory, computer-readable medium of claim 7, wherein receiving the downlink message comprises receiving the downlink message over the short-term connection.

11. The non-transitory, computer-readable medium of claim 7, wherein the message forwarding device comprises an Internet of Things hub.

12. The non-transitory, computer-readable medium of claim 7, wherein one or more other terminal devices are persistently connected to the network access stratum device.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more network communication operations comprising:

receiving, by a network access stratum device, an uplink message sent by a terminal device, wherein the uplink message is sent over a persistent connection between the network access stratum device and the terminal device;

in response to receiving the uplink message, establishing, by the network access stratum device, a short-term connection between the network access stratum device and a message forwarding device;

encapsulating, by the network access stratum device, the uplink message and a session identifier of the persistent connection into a target message;

transmitting, by the network access stratum device, the target message to the message forwarding device over the short-term connection between the network access stratum device and the message forwarding device;

receiving, by the network access stratum device, from the message forwarding device, a downlink message corresponding to the target message, wherein the downlink message comprises the session identifier;

identifying, by the network access stratum device, the terminal device as a receiving device of the downlink message based on the session identifier; and sending, by the network access stratum device, the downlink message to the terminal device.

14. The computer-implemented system of claim 13, wherein the operations comprise:

receiving, by the network access stratum device, a heartbeat request transmission sent by the terminal device;

obtaining heartbeat response information corresponding to the heartbeat request transmission, the heartbeat response information comprising information about a state of the persistent connection between the network access stratum device and the terminal device; and transmitting the heartbeat response information to the terminal device.

15. The computer-implemented system of claim 13, wherein the operations comprise:

determining, by the network access stratum device, that a predetermined heartbeat reporting period is reached;

in response to determining that the predetermined heartbeat reporting period is reached, obtaining heartbeat information of the terminal device, the heartbeat information comprising information about a state of the persistent connection between the network access stratum device and the terminal device; and sending the heartbeat information to the terminal device.

16. The computer-implemented system of claim 13, wherein receiving the downlink message comprises receiving the downlink message over the short-term connection.

17. The computer-implemented system of claim 13, wherein the message forwarding device comprises an Internet of Things hub.

18. The computer-implemented system of claim 13, wherein one or more other terminal devices are persistently connected to the network access stratum device.

* * * * *